CONTINUOUSLY OPERATING APPARATUS FOR MAKING BAGS

Filed Aug. 10, 1953

WITNESSES
Hubert Fuchs
Thomas W. Herr Jr.

INVENTOR:
Arthur W. Richens,
BY Ross C. Hurray
ATTORNEY.

Dec. 11, 1956 A. W. RICHENS 2,773,435
CONTINUOUSLY OPERATING APPARATUS FOR MAKING BAGS
Filed Aug. 10, 1953 10 Sheets-Sheet 2
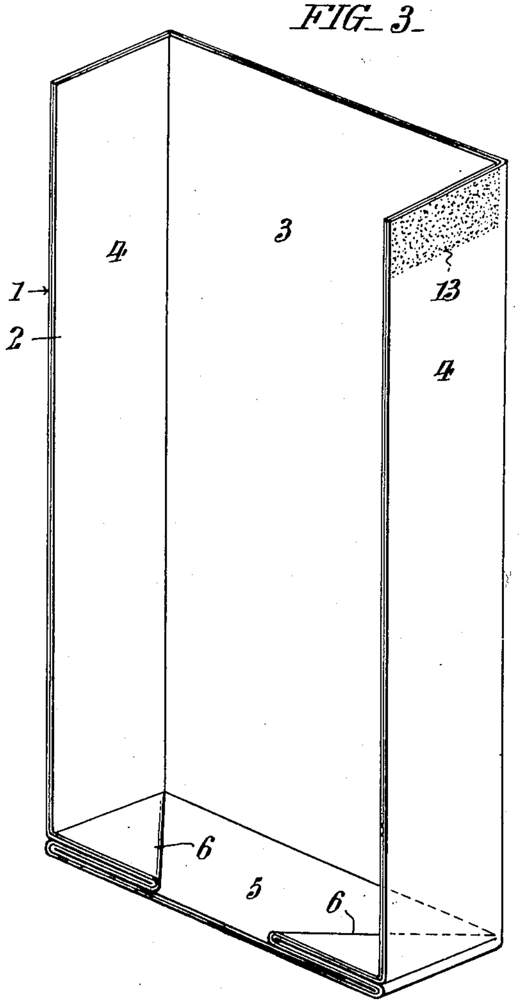
FIG_5_
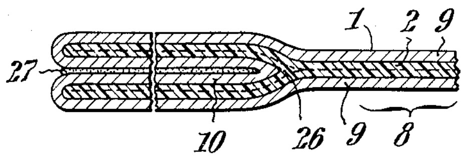
FIG_6_
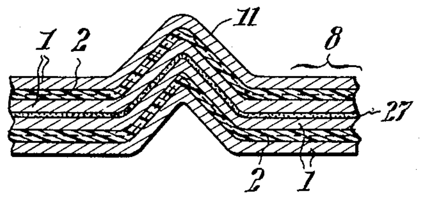
FIG_4_
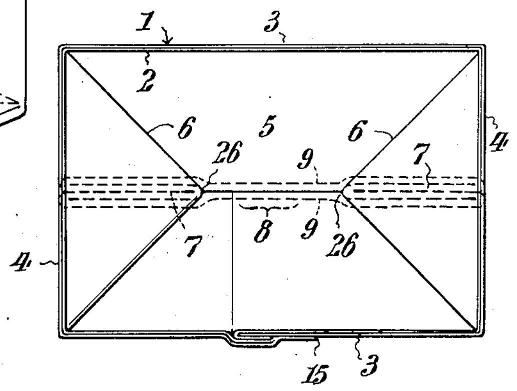
WITNESSES
Hubert Fuchs
Thomas W. Kerr, Jr.
INVENTOR:
Arthur W. Richens,
BY Ross C. Murray
ATTORNEY.

Dec. 11, 1956 A. W. RICHENS 2,773,435

CONTINUOUSLY OPERATING APPARATUS FOR MAKING BAGS

Filed Aug. 10, 1953 10 Sheets-Sheet 3

INVENTOR:
Arthur W. Richens,

BY Ross C. Murray

ATTORNEY.

CONTINUOUSLY OPERATING APPARATUS FOR MAKING BAGS

Filed Aug. 10, 1953

WITNESSES
Hubert Fuchs
Thomas W. Kerr, Jr.

INVENTOR:
Arthur W. Richens,
BY Ross C. Murray
ATTORNEY.

Dec. 11, 1956 A. W. RICHENS 2,773,435

CONTINUOUSLY OPERATING APPARATUS FOR MAKING BAGS

Filed Aug. 10, 1953 10 Sheets-Sheet 5

WITNESSES
Hubert Fuchs
Thomas W. Kerr, Jr.

INVENTOR:
Arthur W. Richens,
BY Ross & Murray
ATTORNEYS.

CONTINUOUSLY OPERATING APPARATUS FOR MAKING BAGS

Filed Aug. 10, 1953 10 Sheets-Sheet 6

INVENTOR:
Arthur W. Richens,
BY:
Ross C. Hurrey
ATTORNEY.

CONTINUOUSLY OPERATING APPARATUS FOR MAKING BAGS

Filed Aug. 10, 1953 10 Sheets-Sheet 7

INVENTOR:
Arthur W. Richens,

BY Ross C. Hurrey

ATTORNEY

Dec. 11, 1956 A. W. RICHENS 2,773,435

CONTINUOUSLY OPERATING APPARATUS FOR MAKING BAGS

Filed Aug. 10, 1953 10 Sheets-Sheet 8

INVENTOR:
Arthur W. Richens,
BY Ross C. Murray
ATTORNEY

INVENTOR:
Arthur W. Richens,
BY Ross C. Hurrey
ATTORNEY

Dec. 11, 1956 A. W. RICHENS 2,773,435

CONTINUOUSLY OPERATING APPARATUS FOR MAKING BAGS

Filed Aug. 10, 1953 10 Sheets-Sheet 10

INVENTOR:
Arthur W. Richens,
BY Ross C. Murray
ATTORNEY

United States Patent Office 2,773,435

Patented Dec. 11, 1956

2,773,435

CONTINUOUSLY OPERATING APPARATUS FOR MAKING BAGS

Arthur W. Richens, Chester County, Pa., assignor to Continental Can Company, Inc., New York, N. Y., a corporation of New York Application August 10, 1953, Serial No. 373,283

6 Claims. (Cl. 93—22)

This invention relates to apparatus for making bags from sheet paper or film or a combination of lamination of the two coated on the inner surface or on certain portions thereof with thermo-plastic adhesive from any material having suitable moisture resisting and heat sealing properties, from material of the latter kind without a lining, or from extruded tubing. The present application is a continuation-in-part of my copending application Serial No. 52,465, filed October 2, 1948, now Patent No. 2,648,263.

The chief aim of my invention is to provide apparatus for making bags of the kind ordinarily known as an "automatic" or square bottomed bag which, when opened up, will stand on end for convenience in filling it, which can be made from any of the materials above referred to, and which has its bottom hermetically sealed against seepage through it of liquids or pulverulent materials with which the bag may be filled.

Another object of my invention is to enable, through provision of apparatus such as hereinafter disclosed, quantity production of automatic or square bottomed bags having the foregoing attributes, expeditiously and economically without having to resort to special cutting, slitting or dieing out operations.

Other objects and attendant advantages will appear from the following detailed description of the attached drawings, wherein:

Figs. 3 and 4 are vertical and horizontal sections of the bag taken as indicated by the angled arrows III—III and IV—IV in Fig. 2.

Figs. 5 and 6 are fragmentary sectional views on a magnified more or less exaggerated scale taken as indicated respectively by the angled arrows V—V and VI—VI in Fig. 2.

Figures 1, 2, 26:
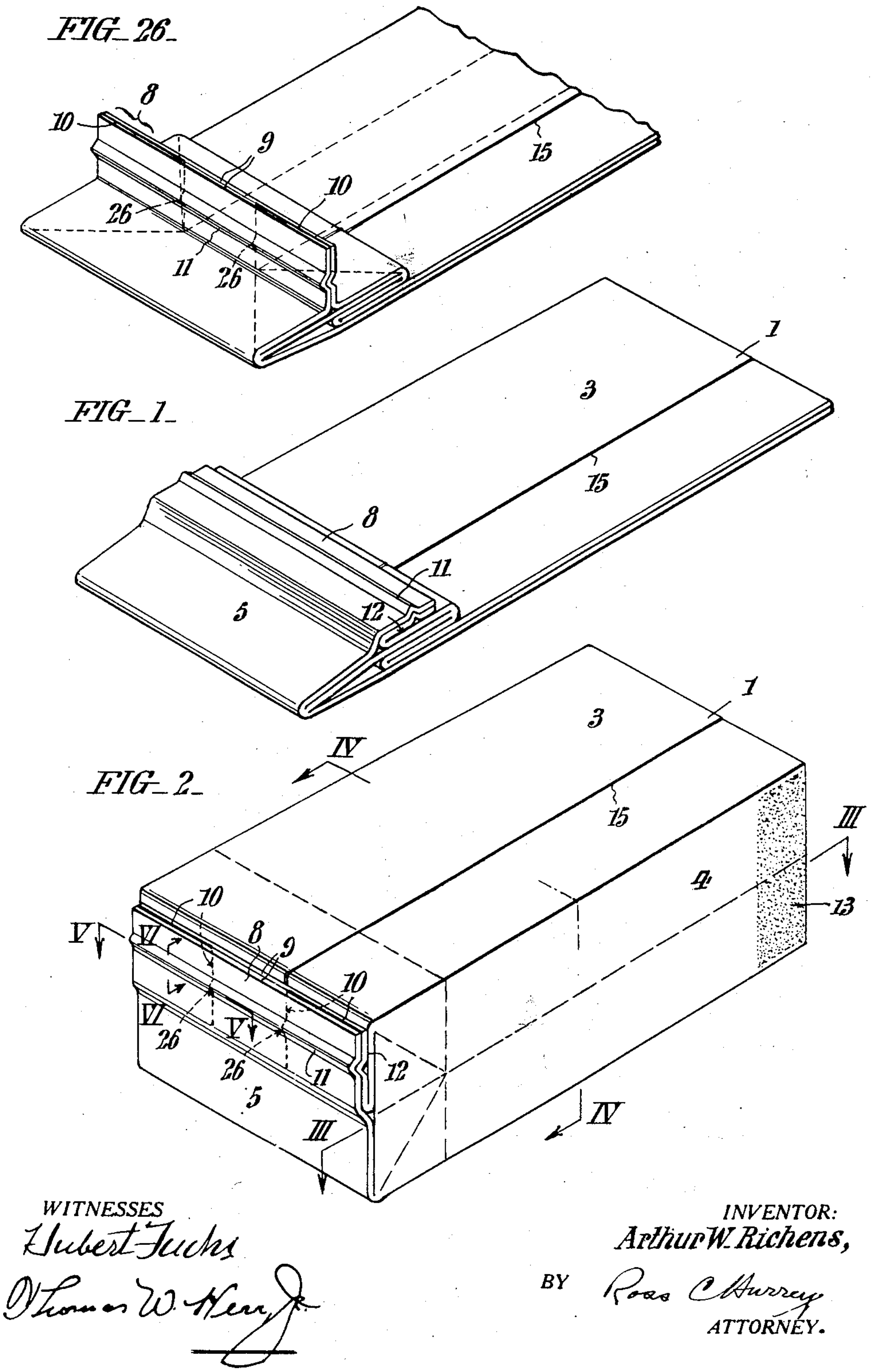
Fig. 1 is a perspective view of a square bottomed bag flattened out in condition for packaging.
Fig. 2 is a view, likewise in perspective, showing the bag opened up in readiness to be filled.
Fig. 26 shows the results of an immediately following operation in which a sharp longitudinal ridge is impressed in the terminal flap and the flap at the same time sealed by hot pressing to fuse together the mutually contacting surfaces of the inner coating or lining of thermo-plastic incorporated in the flap.

For the purpose of clarity and simplicity of illustration all such conventional elements as gearing, framing, cams and shafting have been omitted. For example, the actuation by means of fixed cams of gripper jaws mounted on a rotating drum is entirely conventional, and it is felt that no useful purpose would be served by including such details in this disclosure.

In Figs. 1–4 the bag is shown as formed from a sheet 1 which may be of paper, and an adhered sheet 2 of thermoplastic material, with opposite side walls 3 and opposite end walls 4 at right angles and with a square bottom 5. The bag bottom 5 is constituted by triangular folds 6 which are tucked in from opposite end walls 4 and overlapped by folds turned inward from the side walls 3, and by a crosswise central terminal flap 8 in which extensions 9 of said side walls and interposed lateral tucks 10 (Fig. 5) mutually contact each other. The abutting faces of the lining 2 within the area of the flap 8 are continuously fused together and the bottom rendered leak proof through provision of the flap with a sharply impressed longitudinal ridge 11, said flap being turned down upon the bottom and adhered thereto as shown at 12 in Figs. 1 and 2 so that the completed bag will readily stand on end and when it is to be filled. The end walls 4 are provided at their tops and bottoms with adhesive areas 13 which are to be used in sealing the bag after it is filled.

Figures 8, 9, 10, 11, 12, 13:
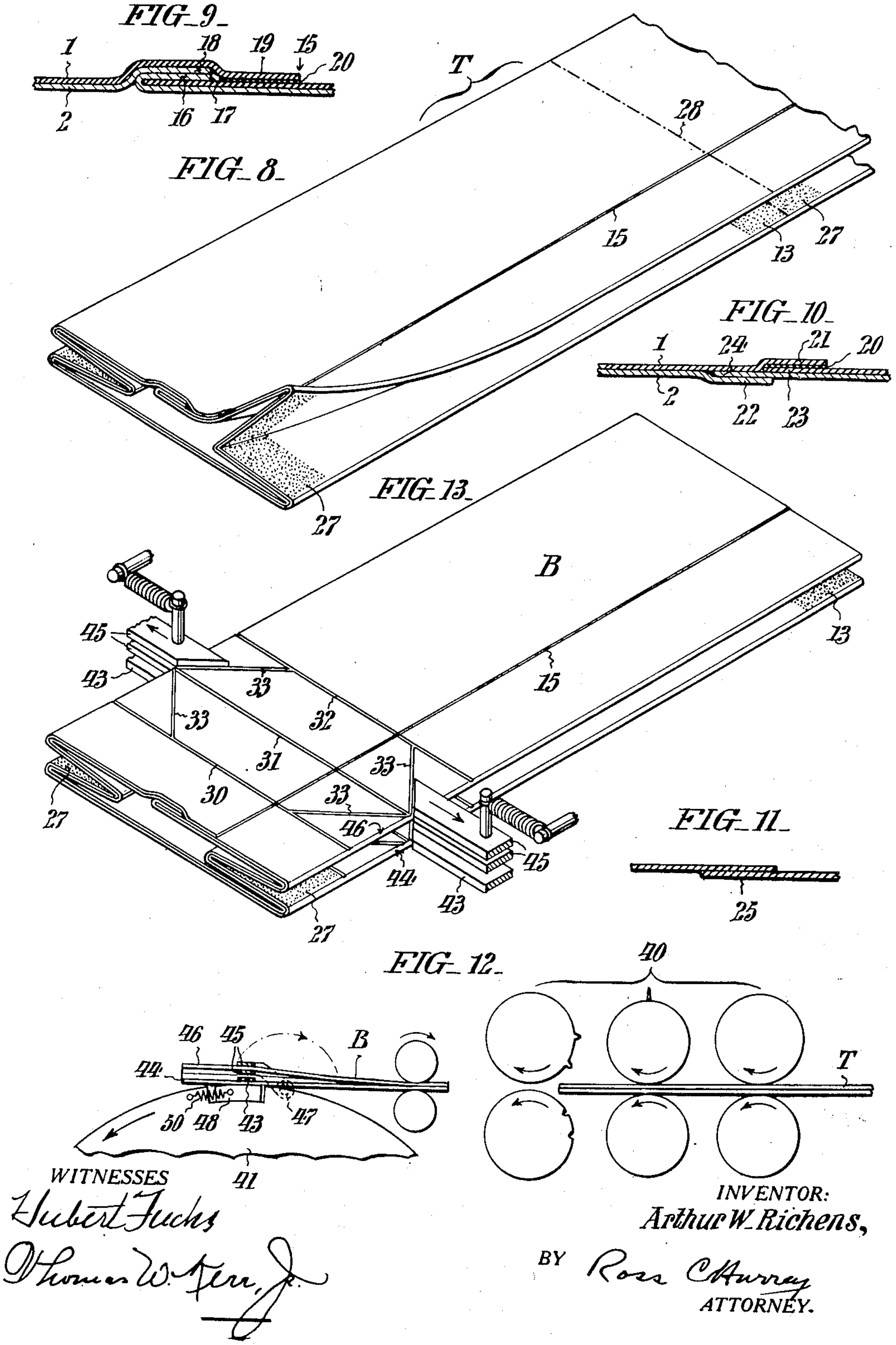
Fig. 8 is a fragmentary perspective view showing a portion of a flat plicated tube from which blanks for the bags are cut.
Figs. 9, 10 and 11 show, in cross section, alternative types of lap joints which may be used for the longitudinal seams when the tube is formed from sheet material.
Fig. 12 is a fragmentary view of a portion of the improved bag producing machine showing the initial steps of cutting the bag lengths from the base tube and scoring them.
Fig. 13 is a perspective view showing how grippers embodied in the machine act upon the scored end portion of a blank in preparation for the formation of the bag bottom.

The paper and lining sheets 1 and 2 may be laterally offset in relation to each other, and the longitudinal seam 15 of the bag formed by retroverting the projecting side edge margin 18 of the lining sheet, see Fig. 9, back upon the outer side of the paper sheet along the corresponding side edge 17 thereof and lapped by a like area 18 of the lining sheet adjacent its opposite edge, and the projecting margin 19 of the paper sheet extended over the outer side of said paper sheet. The seam is sealed by hot pressing to unite the contacting areas of the lining with incidental fusion of thermoplastic adhesive 20 previously applied to the projecting margin of the paper sheet to secure said margin. If desired, the paper margin may be omitted without materially weakening of the seam of Fig. 9. As an alternative, the longitudinal seam may be made as in Fig. 10 by interlapping the marginal edges 21, 22 and 23, 24 respectively of the sheets 1 and 2, and sealed as before by subjection to pressure and heat. When the bag is made from paper coated with thermo-plastic material or from plastic material alone, the seam may be of the simple overlap type shown at 25 in Fig. 11 and hot pressed to effect the bond. As another alternative, the bag may be produced from an extruded tube of thermoplastic material to avoid the necessity for a longitudinal seam. In any case it will be seen that through provision of the sharply indented ridge 11 in the flap 8, a continuous seal will be assured at the bag bottom 5, with avoidance of leaks at the critical region 26 in Fig. 5 adjacent the bends of the in-tucked folds 10 such as invariably occur in square bottomed bags as ordinarily made.

To produce bags from thermo-plastic lined or faced paper in accordance with my invention, I first form a flat longitudinally-seamed laterally-plicated tube T as in Fig. 8 to which, before the folding and plicating, thermoplastic adhesive is applied at regularly spaced intervals as at 27 (depending upon the bag length desired), and cut the tube on transverse lines 28 centrally of the adhesive areas 27 into individual bag blanks B. Upon each such blank I impress, adjacent one end thereof, three parallel uniformly-spaced crosswise score lines 30, 31 and 32, together with angular score lines 33 which diverge inwardly at complemental angles from points of intersection of the central crosswise score line 31 with the side edges of the blank to points of intersection with the outer crosswise score lines 30—32.

It will be understood that the score lines 30, 31, 32 and 33, best shown in Fig. 13, occur on both the front and rear walls of the bag length and, of course, penetrate through the gusset fold.

Figures 7, 18, 19:
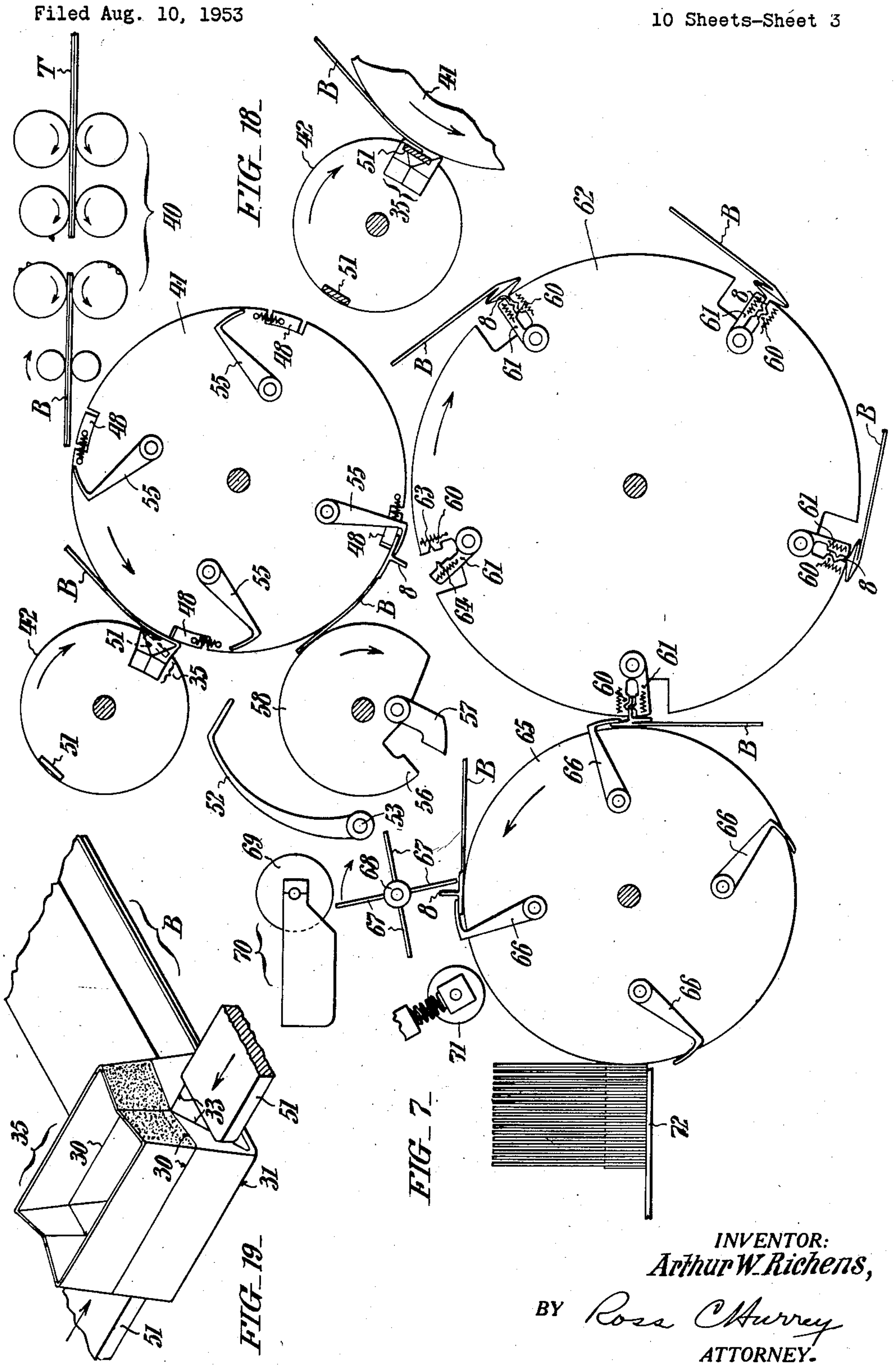
Fig. 7 is a diagrammatic view in longitudinal section of the improved apparatus suitable for the commercial production, in quantity, of bags of the type described.
Figs. 18 and 19 show how the box formation is pushed inward from opposite ends to start collapse thereof about various of the score lines.
Figures 14, 15, 16, 17:
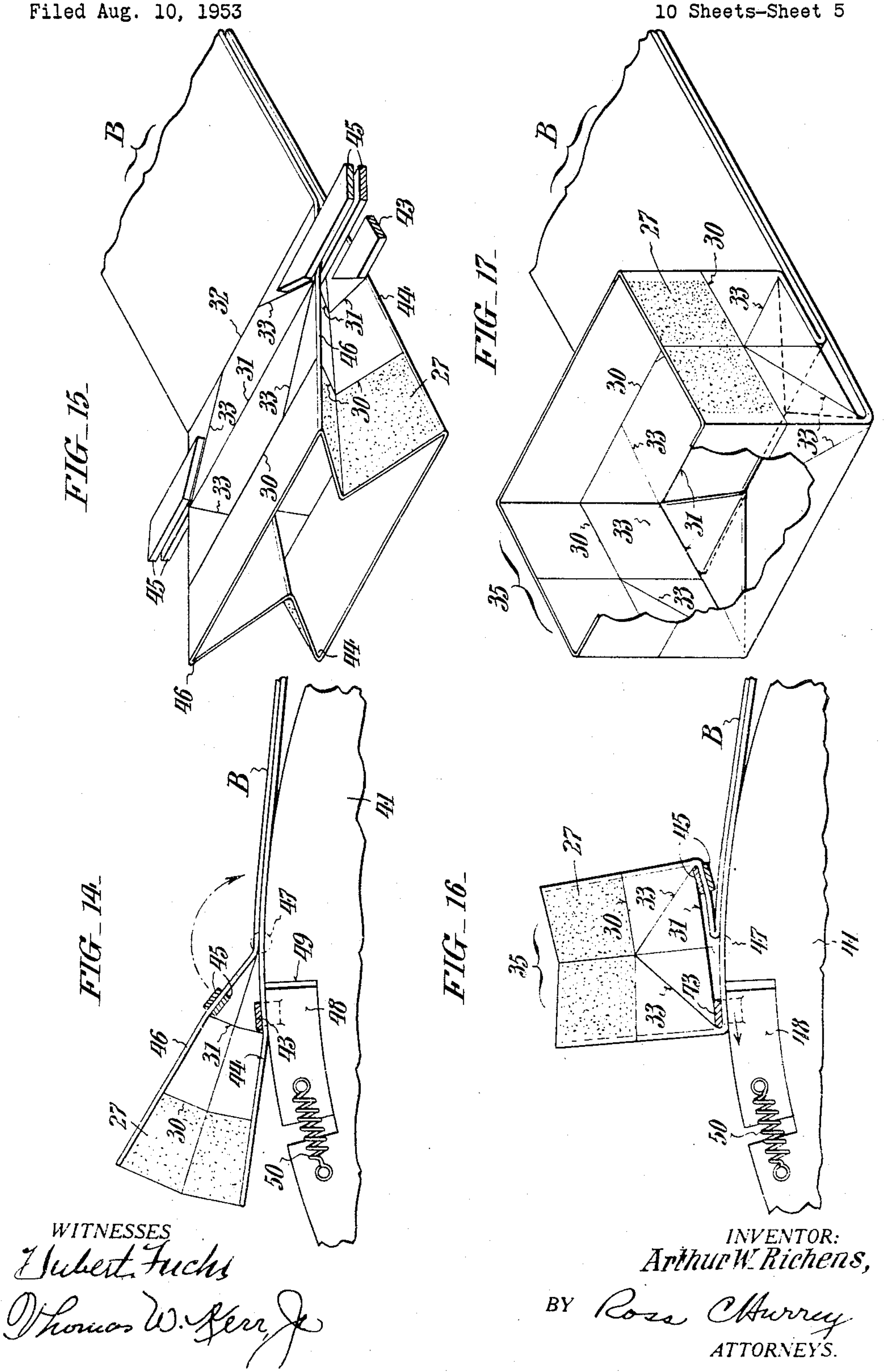
Figs. 14, 15 and 16, 17 are views like Figs. 12 and 13 respectively, showing the several operations of my improved apparatus by which the scored portion of the blank is opened up to box formation and at the same time turned upright.
Figures 20, 21, 22, 23, 24, 25:
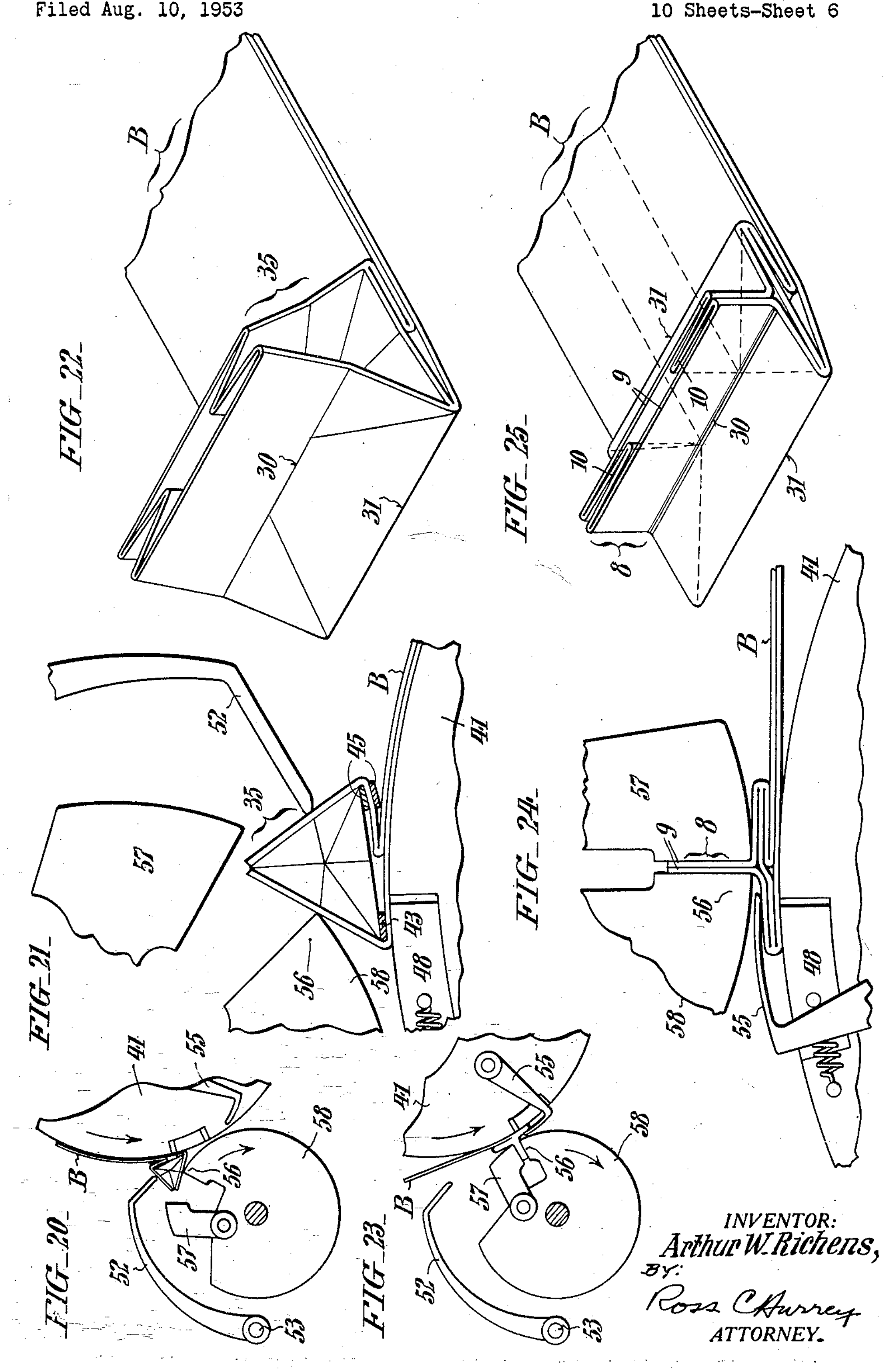
Figs. 20 and 21 are fragmentary portions of the machine by which the box formation is next pushed in from opposite sides to induct further collapse with attendant formation of an upstanding crosswise terminal flap.
Fig. 22 is a perspective view showing the blank with the bag bottom partly collapsed.
Figs. 23 and 24 are fragmentary views of another part of the machine, showing a succeeding operation by which the bag bottom is completely collapsed.
Fig. 25 is a perspective view of the blank after the bag bottom is collapsed as in Figs. 23 and 24.

The scored portion of the blank is then opened out and turned up into box formation as at 35 in Fig. 17 about the central crosswise line 31 as an axis, whereupon the up-turned portion is first pushed in from opposite ends as in Fig. 19 and then from opposite sides as in Fig. 22, and as a consequence caused to collapse as in Fig. 25. As the collapse takes place, the triangular areas defined by the crosswise and angular scorings fold into the tucks 6 previously referred to, with extensions 9 of the side walls 3 upstanding and the fold portions 10 of the tube plications interposed between them. The ridge 11 is next impressed in the flap 8 and the latter at the same time subjected to heat and pressure to fuse the contacting areas of the lining or facing and provide the seal. Finally, thermo-plastic or other adhesive is applied to one side of the flap 8 and the flap is turned down and adhered to the bag bottom as in Fig. 1, likewise by application of heat and pressure to complete the bag.

By means not illustrated, but which may be of any suitable construction well known in the art, the plicated tube T of Fig. 8 is delivered to a set of rolls 40 by which it is scored in the manner already described and at the same time cut into the individual blanks B. From the rolls 40 the successive blanks pass between a relatively large wheel 41 and a cooperative smaller wheel 42. The large wheel 41 is provided at equally spaced points in its periphery, see Figs. 12, 13 and 14, with retractable hold down fingers 43 which engage over the lower fold edges 44 of the plications of the blank from opposite sides immediately rearward of the angular score lines 31, and with retractable spring-influenced gripper fingers 45 which engage the corresponding portion of the upper plication 46 and which are individually swingable about centers 47 (Fig. 14). By suitable means, not illustrated, the gripper fingers 45 are swung as in Figs. 12 and 14 whereby the scored part of the blank is opened up into the box-like configuration as shown at 35 in Figs. 14 and 16 after which the blanks pass between the wheel 41 and a smaller cooperative wheel at 42. As the grippers 45 are swung in the manner just explained, the springs to which they are subject act to keep the blank tensioned crosswise to prevent buckling along the score lines 31 and 32. As shown, the hold down fingers 43 are supported by blocks 48 occupying notches 49 in the periphery of the wheel 41, said blocks being acted upon by relatively light pull springs 50. The wheel 42 carries a pair of retractable fingers 51 which push the ends of the box-like formation inward as in Figs. 18 and 19 to induce collapsing thereof in one direction. By means of a tucking finger 52 fulcrumed at 53, the box-like formation 35 is next engaged from one side, and soon thereafter from the opposite side as in Fig. 21 by a movable clamp jaw 57 on another wheel 58. Initiation of the collapse of the box-like formation by the fingers 51 is facilitated not only by the gusset folds but also by the score lines 33.

The jaw 57 is opposed by a fixed clamp jaw 56 on wheel 58 and eventually closes upon the upturned end of the box-like formation as shown in Fig. 23 to complete its collapse, the gripper fingers 43 and 45 being withdrawn from operative position at this time. One of the pivoted clamp fingers 55 on wheel 41 next comes into action to hold the blank to said wheel until the flap 8 which results from the collapsing passes into the interval between fixed and movable electrically heated clamp jaws 60 and 61 at the periphery of still another wheel 62, whereupon the finger 55 is withdrawn. As shown the fixed and pivoted clamp jaws 60 and 61 of the wheel 62 are respectively provided with a sharp transverse V groove 63 and a mating V projection 64 to impress the ridge 11 in the tab 8. The jaws 60 and 61 remain closed during the greater part of a revolution of the wheel 62 to keep the flap 8 under pressure for fusion of the thermo-plastic lining or facing and the adhesive 27 involved in the plies 9 and folds 10 of the flap and to hold the blanks to said wheel for delivery to still another wheel 65 which is provided with hold down fingers 66 to receive the blanks B. As the blanks are carried about the wheel 65, thermo-plastic or other adhesive is applied to the tabs 8 at one side by wiper vanes 67 of a rotor 68 which receive the adhesive through contact with the roll 69 of an adhesive supply device 70. After such application of adhesive, the blanks pass beneath a press roll 71 whereby the tabs 8 are turned down and the adhesive is fused to fix them to the bag bottoms. The now completed flat bags are finally delivered upright by the wheel 65 to a table 72 when the fingers 66 on said wheel are retracted to release the bags.

In many cases it will be desirable to carry out the steps heretofore disclosed by passing the bag along a straight line rather than transfer it from one to another of consecutive drums. True enough the straight line arrangement requires more floor space than the consecutive drum arrangement but, on the other hand, the straight line arrangement provides greater accessibility and quite a bit more latitude in the matter of adjustment for changes of size. The problem of straight line production is approachable in a number of ways of which one typical installation has been illustrated in Figures 27–36.

Figure 27:
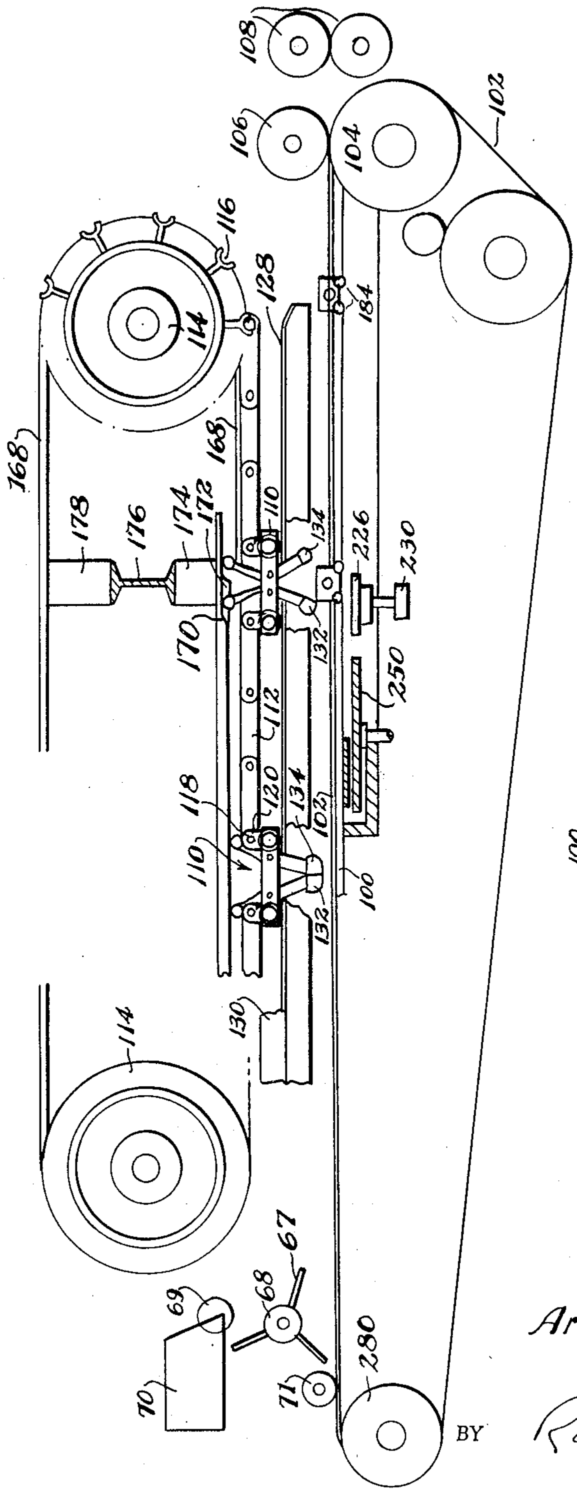
Fig. 27 is a side elevation partly in section of another form of apparatus for making bags of the type described.

Referring now to Figure 27 there is shown a table 100 over which runs a belt conveyor 102. The belt 102 comes to the table 100 over a roll 104 which bears upon a pressure roller 106. The coacting rolls 104 and 106 receive bag lengths from a pair of scoring rolls 108 identical with those heretofore disclosed.

Heat sealing units generally designated 110 are adequately spaced by links 112 to pass over wheels 114 around the periphery of which are sockets 116 which receive pins 118 (Figures 29 and 30) mounted in bosses 120 on body members 122 of the unit 110.

In active position each unit 110 is supported by wheels 124 journaled on spindles 126 which are fitted in the body portion 122. The wheels 124 ride on rails 128 supported on angle irons 130 which in turn are supported by conventional framework (not shown).

Each gripper unit 110 has a leading jaw 132 and a trailing jaw 134. Jaw 132 has an interior heating element 136 while the trailing jaw 134 has a heating element 138. Jaw 132 depends, by an arm 140, from a pivot 142 journaled in the body portion 122 of the unit 110 while the jaw 134 depends by an arm 144 from a pivot 148 similarly mounted in the body portion 122. An upper arm 150 forms a continuation of the lower arm 140 and terminates in a boss 152 containing a pin 154 on which a roll 156 is journaled. The arm 144 continues as an arm 158 terminating in a boss 160 in which is mounted a pin 162 on which a roll 164 is journaled. It is clear that depression of the rolls 156 and 164 as by means of a cam bar 166 will bring the jaws 132 and 134 into pressure contact while the elevation of the rolls 156 and 164 as by means of a lower cam 168 (Figure 27) will separate the jaws 132 and 134. Since, transverse the machine, the rolls 156 and 164 are well spaced, simultaneous actuation is secured by providing separate cam portions (Figure 27) 170 and 172 which are longitudinally spaced. The cam 166 is supported by a series of columns 174 depending from transverse I-beams 176 which in turn support, by means of columns 178, the upholding cams 168.

Mounted on each side of the conveyor 102 is track 180 in which are formed grooves 182 which act as rails to support the wheels 184 of a series of bag bottom opening carriages 186 on which are mounted a leading pair of arms 188 and 190 secured to a support 192 resting in a groove 194 in the carriage 186. These arms are drawn forward by means of relatively light pull springs 196. A second pair of arms 198 and 200 are secured to a pivot 202 mounted in a boss 204 secured to the carriage 186. At the back end of the pivot 202 a pinion 206 is frictionally secured.

Figure 28:
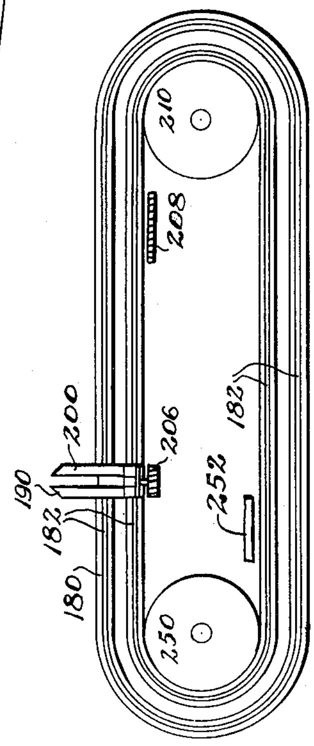
Fig. 28 is a plan view of part of the mechanism disclosed in Fig. 27.
Figure 29:
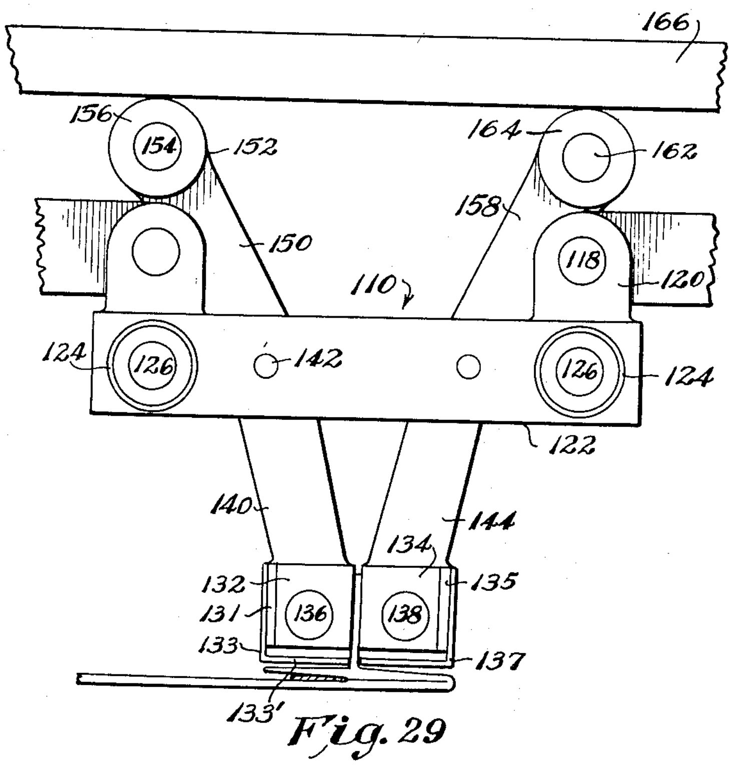
Fig. 29 is a side elevation of the heat sealing jaws shown in Fig. 27.
Figures 30, 32:
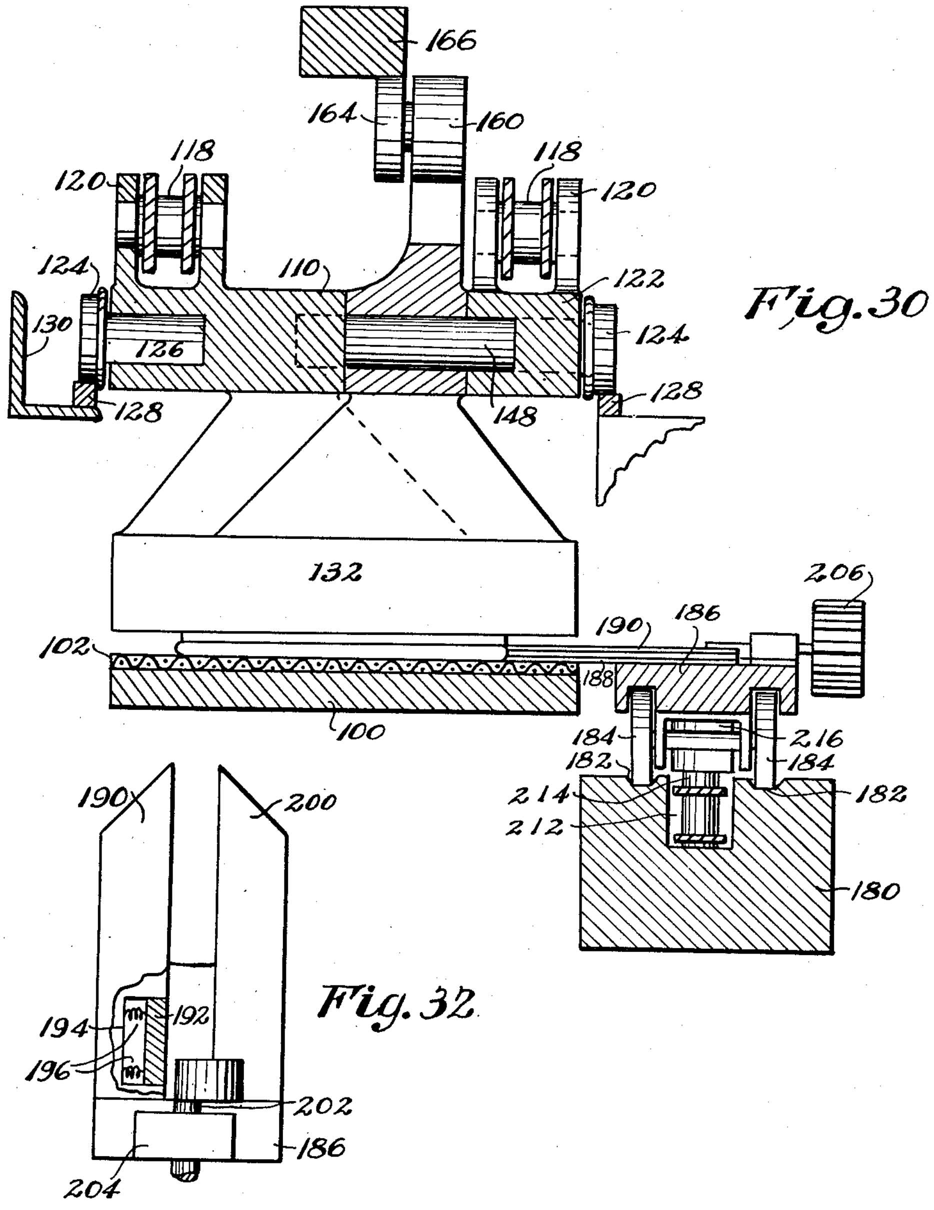
Fig. 30 is a section through various parts of the unit illustrated in Fig. 29 and includes a side elevation of one of the bottom opening carriages.
Fig. 32 is a plan view of one of the carriages.
Figure 31:
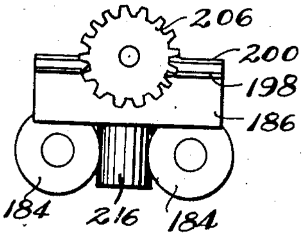
Figure 31 is a rear elevation of one of the bottom opening carriages.
Figures 33, 34, 35, 36:
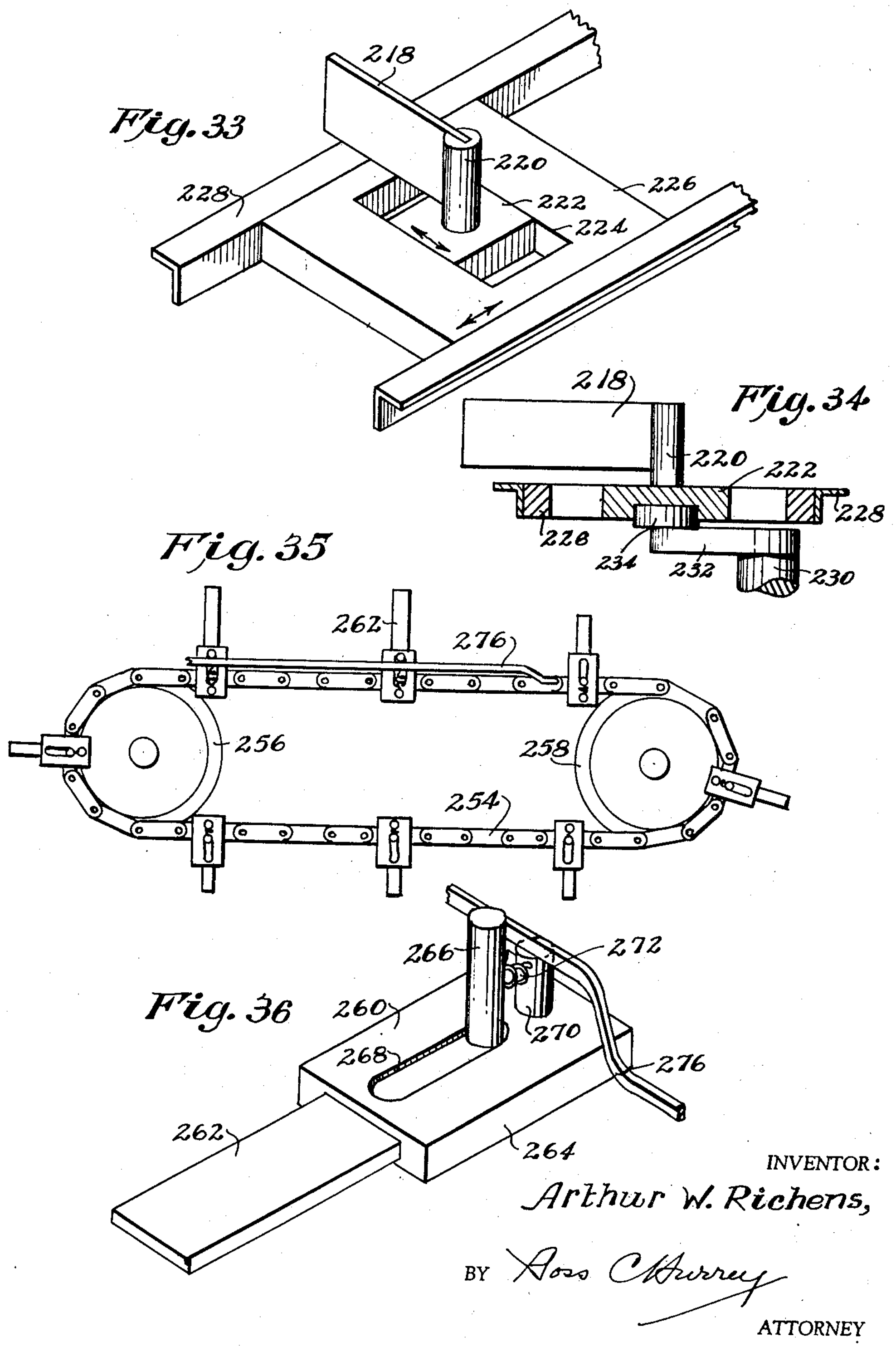
Fig. 33 is a perspective view from above one of the gusset tucking units.
Fig. 34 is a section on the line 34—34 of Fig. 33.
Fig. 35 is a perspective view of one of the carrier units for removing bags from the machine.
Fig. 36 is a section on the line 36—36 of Fig. 35.

Initially the arms 198 and 200 are superimposed upon the arms 188 and 190 and in this condition as was the case with arms 43 and 45 they enter the gussets of the bag length with arms 188 and 190 securing the lower gusset and with arms 198 and 200 securing the upper gusset. As best shown in Figure 28, once the arms have entered the gussets the pinion 206 encounters a fixed rack 208 which has the effect of swinging the arms 198 and 200 to the position illustrated in Figures 31 and 32. This opens the leading end of the bag to the box-like condition shown in Figure 17. The several arms are brought into contact with the bag by a wheel 210 driving a sprocket 212 in which at suitable intervals an upstanding pin 214 engages a boss 216 projecting downward centrally of each carriage 186.

With the bag end in the condition illustrated in Figure 17 the bag progresses to the area represented by the cams 170 and 172 in Figure 27. At this point on opposite sides of the conveyor 102 are mounted a pair of tucker blades 218 adjustably clamped in posts 220. The posts 220 are rigidly mounted on a block 222 which is slideably mounted in a groove 224 in a second block 226. The second block 226 is slideably mounted in a fixed frame 228. A shaft 230 carries an eccentric 232 which has a pin 234 engaging the first mentioned block 222. As the shaft 230 rotates, the blade 218 is given orbital movement toward and from the fold line of the gussets of the bag but remains at all times at right angles to the conveyor 102. This has the effect of tucking in the gussets in the manner achieved by the members 51 as illustrated in Figure 19. The shaft 230 is driven through a one-revolution clutch (not shown) which is tripped periodically as a bag bottom comes into position. At about this time a heat sealing unit encounters the cams 170, 172 which act to move the heat sealing jaws 132 and 134 toward each other which completes the collapse of the bag bottom tc provide the upstanding fin shown at 9 in Figure 24 and then continue to exert heat and pressure on the fin to effect the various sealing operations heretofore described.

If the heat sealing jaws 134 and 138 were permitted to contact the bottom of the bag, inevitable blocking of the bottom would occur far too frequently. At the same time if the fold lines between the fin and the bottom are to be perfected there must be positive contact at the time of collapsing. This problem has been met by shortening the jaws to provide a substantial clearance between the bottom of the hot jaw and the bottom of the bag. An insulated disc 131 is secured to the jaw 132 and to this is secured an L-shaped strip of highly polished metal 133 having a leg 133′ which contacts the bottom of the bag and perfects the fold line between that portion of the bag bottom and the upstanding fin. Similarly, a disc of insulating material 135 is secured to jaw 134 and a similar metal strip 137 is secured thereto and extends under the jaw and in contact with the bag.

The fingers 190 and 200 continue to travel with the bag until the carriage 186 is drawn by the links 212 around a wheel 250 which removes the fingers from the bag and starts the carriage on its return trip. Immediately on starting the return straightaway the pinion 206 encounters a second rack 252 directed vertically opposite to the rack 208. This acts to return the fingers 198 and 200 to their initial position superimposed over fingers 188 and 190. The bag continues to travel in the grip of jaws 132 and 134 until it approaches close to the spider 114 at which point the lower cam 168 takes over and the upper cam is relieved to cause the jaws 132 and 134 to open. Adjacent this point a chain 254 runs on sprockets 256 and 258 parallel to the belt 102. Spaced at bag length intervals along the chain 254 are units 260 each of which comprises a blade 262 slidably mounted in a shell 264. Each blade 262 has secured thereto a post 266 extending upwardly through a slot 268 in the shell 264. Rearwardly of the slot 268 a second post 270 is secured to the shell 264 and a tension spring 272 connects the posts.

As the units 260 progress the posts encounter a cam 276 which extends the blades 262 into the path of the bags so that each blade engages a bag at the fold line 32. The bags are then carried under a paste applicator 68 having applicator fingers 67 which receive paste from a roll 69 fed from a paste vat 70 (see Fig. 7). Thereafter the bags pass beneath a roller 71 which flattens the hitherto upstanding fin into contact with the bodies of paste which the fingers 67 have applied to the bottom of the bag.

Immediately after the bags have passed below rollers 71 the cam follower 274 encounter a retractive portion of the cam 276 and are withdrawn, permitting the bags to be discharged from the belt 102 over a return roller 280.

What is claimed is:

1. Apparatus for making bags comprising: means for gripping a bag length of flattened gussetted tube, said means also being operative to open one end of said tube to form an open rectangular box having its bottom in the flattened body of the tube; positively acting means being operative to collapse said box like structure against the body of the bag to leave an upstanding fin running transverse the length of the tube; heated jaws receiving said upstanding fin and subjecting the same to heat and pressure; means operative thereafter for applying adhesive within the area of the fin and means operative thereafter for folding the fin against the body of the bag.

2. Apparatus for making bags comprising: a drum having grippers at spaced points around its periphery, said grippers engaging one end of a bag length of flattened gussetted tube; means for operating said grippers so as to open the leading end of the tube into a rectangular box like configuration with the bottom of the box folded against the body of the tube; traveling means for tucking inwardly the gusset folds in the box like formation; additional traveling means for collapsing the box like formation to leave a transverse upstanding fin; a second drum having spaced around its periphery pairs of heated gripping jaws, said second drum being so located with reference to the first drum as to receive and grip the upstanding fin; means operative when the fin is gripped by said heated jaws for releasing the bag from the first mentioned drum; a third drum receiving bags from the second drum after heat sealing is completed; and means coacting with said third drum for applying paste adjacent said fin and for folding the fin against the body of the bag and into said paste.

3. Apparatus for making bags comprising: means for continuously advancing a series of bag lengths of gussetted tube in a substantially straight line; means traveling parallel to the line of advance for entering the gussets at the leading end of the bag and for rotating the upper gusset fold relative to the lower gusset fold to bring the leading end of the bag into a rectangular box like condition with the bottom of the box folded against the body of the bag; a plurality of heat sealing jaws above the bag advancing means; means coacting with said gripping means to collapse said rectangular box like structure against the body of the bag and to place an upstanding fin between said heat sealing jaws; means to release said jaws when heat sealing has been completed and means operative thereafter to apply paste in the vicinity of the fin and to fold the fin against the body of the bag.

4. Apparatus for making bags comprising means for gripping a bag length of gusseted tube, said means also being operative to open one end of said tube to form an open rectangular box therein, positively acting means for collapsing said box like structure against the body of the bag to leave a fin that projects up from the collapsed box, heated jaws adapted to receive said fin and subject the same to heat and pressure.

5. Apparatus for making bags comprising a drum having grippers at spaced points around its periphery for engaging one end of a bag length of gusseted tube, means for rotating the drum, means for operating said grippers so as to open the leading end of the tube into a rectangular box like configuration, traveling means for tucking inwardly the gusset folds in the box like formation, additional traveling means for collapsing the box like formation to leave a fin that projects up from the collapsed box, a second drum having spaced around its periphery pairs of heated gripping jaws, means for rotating the said second drum, said second drum being so located with reference to the first drum as to receive and grip the said fin between a pair of said heated gripping jaws for heat-sealing the said fin to close and seal the collapsed box like formation, and means operative when the fin is gripped by said heated jaws for releasing the bag from the first mentioned drum.

6. Apparatus for making bags comprising means for continuously advancing a series of bag lengths of gusseted tube in a substantially straight line, traveling means for entering the gussets at the leading end of the bag and for rotating the upper gusset fold relative to the lower gusset fold to bring the leading end of the bag into a rectangular box like condition, a plurality of heat-sealing jaws above the bag advancing means, means coacting with said gripper means to collapse said rectangular box like structure against the body of the bag and to place a fin that propects up from the collapsed box between said heat-sealing jaws for sealing the bottom of the bag.

References Cited in the file of this patent

UNITED STATES PATENTS

| | | |
|---|---|---|
| 812,378 | Strasburg | Feb. 13, 1906 |
| 1,058,806 | Stilwell | Apr. 15, 1913 |
| 2,353,402 | Haslacher | July 11, 1944 |
| 2,412,501 | Gardner | Dec. 10, 1946 |
| 2,648,263 | Richens | Aug. 11, 1953 |